Patented Jan. 16, 1934

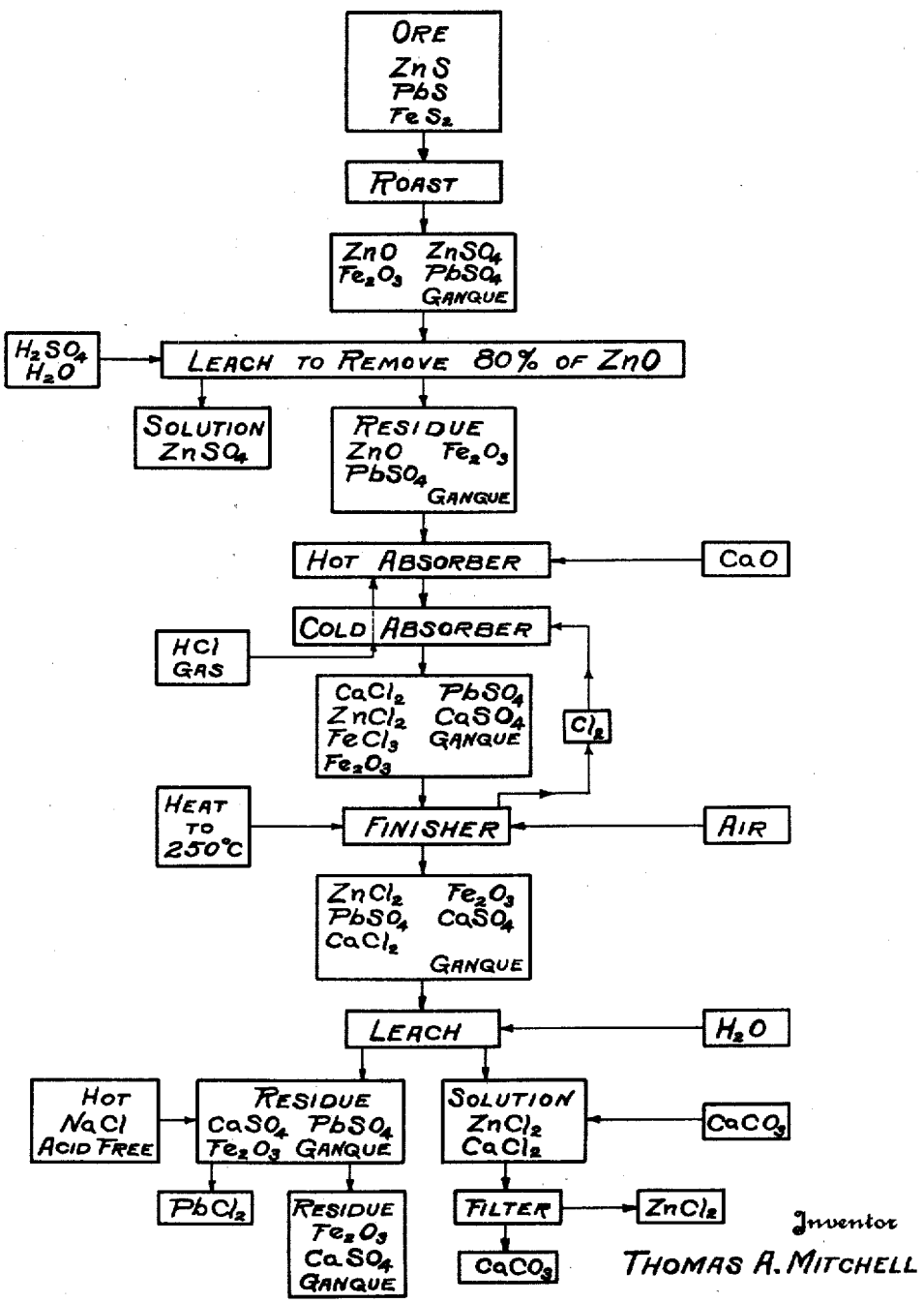

1,943,340

UNITED STATES PATENT OFFICE 1,943,340

METHOD OF RECOVERING VALUES FROM A SULPHIDE ORE

Thomas A. Mitchell, Denver, Colo., assignor to Lafayette M. Hughes, Denver, Colo.

Application December 24, 1931
Serial No. 582,938

9 Claims. (Cl. 75—67)

This invention relates to a method of recovering zinc and other values from a sulphide ore, and more particularly for obtaining metal compounds from a complex ore which are free from undesired impurities.

One method heretofore developed by me for treating zinc sulphide ores has involved roasting the ore and subsequently chloridizing the roasted material with hydrochloric acid gas. I have found that if the zinc content of the ore is high, this type of chloridizing operation may not in all cases give 100% extraction of the zinc. This is due to the fact that the reaction of hydrochloric acid on zinc oxide produces a large quantity of water and the zinc chloride dissolves therein with the formation of a syrupy, gummy mass which permeates the pores of the ore particles and closes them to the entrance of the gaseous reagent. Consequently, the chloridizing operation is not easily carried on to completion and there is likely to be a loss of zinc during this treatment.

It, moreover, is desirable to produce zinc sulphate as well as zinc chloride for various uses, and particularly to provide a method of forming zinc sulphate which is free from iron, commonly associated with zinc in sulphide ores. It has also been proposed to treat a zinc ore material preliminary to a smelting operation by an acid leaching process to remove zinc as a sulphate, but the disposal of the residue has been unsatisfactory owing particularly to the shortcomings of the smelter practice. There are advantages, however, in the use of an acid leach in the treatment of a zinc sulphide ore, since it is cheaply and easily carried out, and if the ore is first roasted, the sulphur is available for the manufacture of sulphuric acid which may be used for the leaching step.

A further problem, however, lies in the fact that when one roasts a zinc sulphide ore, which usually contains iron sulphide, the roasted material may contain both the oxide and the sulphate of zinc as well as ferrous or ferric oxide. Consequently, any attempt at leaching the ore with sulphuric acid may dissolve the ferrous oxide as well, and the step of chloridizing the roasted ore may produce a product containing not only zinc sulphate but also iron in a soluble form. Hence, an iron free solution of a zinc salt is not obtained in either case, and the zinc chloride leached from the chloridized material is contaminated with zinc sulphate.

The primary objects of this invention are accordingly to provide an efficient method for recovering substantially all of the zinc from a sulphide ore or a bulk concentrate thereof which has a high zinc content, and to obtain both zinc sulphate and zinc chloride, each of which is free from contamination by the other and by iron compounds.

A further object of this invention is to utilize an acid leaching step in the recovery of zinc from its ore and overcome various difficulties heretofore met in the prior practice and to provide a simple, economical and effective process for treating either a simple or a complex zinc bearing ore and recovering all of the desired values.

Another object is to recover such values as zinc and lead from a complex ore by a series of steps which serve to dissolve the zinc and lead and so remove them from residue without at the same time rendering the iron content of the ore soluble, and thereby separating the iron from the other values and leaving it in the residue.

With these and other objects in view, as will be apparent to one skilled in the art, my invention resides in the combination of process steps set forth in the specification and covered by the claims appended hereto.

In accordance with my experimentation, I have discovered that these desirable ends may be accomplished in the treatment of a zinc sulphide concentrate or other sulphide ore materials containing a considerable quantity of a zinc compound as well as various others, such as the sulphides of iron, lead, copper and so forth, if the ore is first roasted to produce zinc oxide with or without zinc sulphate and to keep any iron present wholly in the ferric form, after which the ore is treated by a leaching step which removes all of the zinc sulphate and, if desired, converts a considerable portion of the zinc oxide to the sulphate form, sufficient zinc oxide being left in the residue to insure that any iron oxide present will not go to the sulphate. Thereafter, the residue is chloridized to convert the residual zinc oxide to zinc chloride, this operation being so carried on as to prevent the formation of zinc sulphate and to insure that the iron remains as ferric oxide at the end of the chloridizing step.

In order that the invention may be more fully understood, let us assume that a bulk concentrate of a complex ore containing zinc, lead and iron sulphides is being treated and that there is only a low content of silicates in the ore. The process for recovering zinc and lead may be carried on in accordance with the diagrammatic arrangement of steps illustrated in the accompanying drawing; but it will be understood that various modifications may be made in the process, depending upon the nature of the ore being treated, in accordance with standard knowledge or with the principles and the alternative steps herein described.

This complex ore may be first bulk concentrated to remove a considerable amount of the quartz and other siliceous materials, and particularly so that the production of a sintered product may be minimized. The ore is also preferably ground to a finely divided condition. The oxidizing roasting step may be carried on in accordance with standard practice to produce zinc oxide, and possibly some zinc sulphate, as well as ferric oxide and lead sulphate. The temperature and other conditions of the operation are suitably controlled for the purpose and particularly to insure that the iron is present only as ferric oxide. It is preferable to roast the ore in a rotary tube kiln or in a roaster of the standard wedge type, and precautions are to be taken to prevent sintering of the material as much as possible.

If the ore contains a large amount of silicates or other materials which tend to produce a sintered or vitreous condition, then I may roast the ore in a finely divided condition and in intimate mixture with an alkaline earth material, such as calcium oxide, hydrate or carbonate, which is present in sufficient quantity to reduce this sintering condition. The calcium oxide thus introduced or formed during roasting is present in sufficient quantity, and preferably in an excess, to react with all of the available sulphate radical, which is provided by the sulphur trioxide gas, and to prevent the zinc from going to the sulphate form. The lime also serves to produce an open and porous structure in the ore particle and to make it readily permeated by leaching solutions and by the gaseous chloridizing reagents later employed in the process. This lime-roasting treatment may be carried on in accordance with the process set forth in my prior application Serial No. 449,079 filed May 1, 1930. It is to be noted that the roasting operation need not be carried to completion, whether or not the lime is used, since my preferred method of chloridizing the roasted ore will take care of a considerable quantity of unroasted zinc sulphide. Ordinarily, 4 or 5% of the zinc sulphide may be left in the roasted material, so as to minimize any tendency for sintering to take place. This present process is, however, particularly adapted to bulk concentrates containing a low silicate content, and in some cases the lime may be omitted from the ore to be roasted.

In order to obtain iron free zinc sulphate from this ore, I propose to leach the roasted ore material with water to dissolve such zinc sulphate as is present, and if it is desired to remove more of the zinc content, I may leach the ore with dilute sulphuric acid to convert some of the zinc oxide to zinc sulphate and remove it with the zinc sulphate which was formed during the roasting operation. For this purpose, I utilize water acidulated with sulphuric acid to the desired concentration, as is well understood in the art, and treat the roasted ore with such an amount of the acid as will remove the required percentage of the zinc oxide. A strong solution of sulphuric acid should not be used, since it will attack various ore materials and thus introduce undesired impurities into the zinc salt solution. It is desirable that no iron go into solution; hence, I so control the treatment that a considerable portion of the zinc oxide is left with the residue and, for practical purposes, I generally take out only about 80% of the zinc oxide. The presence of zinc oxide in close association with the iron oxide in the finely divided ore material prevents the iron from being dissolved as a sulphate; hence, the acid treatment should be carefully controlled.

As a result of this step, I secure a zinc sulphate solution which is not contaminated with iron to any considerable extent. The zinc sulphate solution thus obtained may be further purified by suitable and standard methods, it being understood that while a crude operation of this type gives a substantially iron free solution of zinc sulphate, yet the solution may contain traces of iron as well as other undesired impurities. The zinc sulphate as thus produced is particularly adapted for the manufacture of zinc sulphide pigment and so may be employed as such without necessitating evaporation and crystallization of the salt. By treating it directly with sodium sulphide of required purity, I may obtain zinc sulphide which is free from many undesirable contaminating compounds heretofore found in zinc sulphide pigments.

The residue from the leaching operation contains a small amount of zinc oxide, lead sulphate and ferric oxide as well as various other materials making up the gangue of the ore. A large proportion of the zinc has been removed from the ore and the small amount left in the residue may be easily treated with hydrochloric acid without the formation of the syrupy condition above described. Such water as is produced by the chloridizing reaction will be taken up by the inerts and other materials present and there will not be enough left to dissolve zinc chloride to any detrimental extent.

The next stage of my process involves chloridizing the remaining zinc which is preferably treated in a substantially dry, but slightly moistened condition. This may be done in accordance with the following procedure, which is described and claimed broadly in my copending applications Serial No. 520,050, filed March 4, 1931, Serial No. 597,627 filed March 8, 1932 and Serial No. 687,827 filed September 1, 1933. There may be some residual zinc sulphide in the roasted material or other source of the sulphate radical which might result in the formation of zinc sulphate during the chloridizing steps as herein described. It is desirable that the zinc be obtained wholly as a chloride, hence I propose to chloridize the roasted ore material in the presence of sufficient oxide or chloride or other suitable compound of an alkaline earth metal, such as calcium, strontium, or barium, which is capable of reacting with all available sulphate radical to form an insoluble alkaline earth metal sulphate, to compel all of the zinc, copper or like behaving metal to go to the chloride form. The amount of alkaline earth compound to be used may be calculated by analyzing the roasted material and determining the sulphur content thereof, and it is ordinarily desirable to employ an excess of the reagent in order to insure that no zinc sulphate will be formed. The alkaline earth material is preferably pulverized and intimately mixed with the ore material to be treated. Calcium oxide is the preferred reagent and it may be used in the roasting operation in excess of the required quantity so that no more need be added for the chloridizing step. It may be added either as a powder or as a solution in water, and in the latter case calcium hydrate or chloride is employed for the chloridizing step.

The term "alkaline earth metal compound" and similar expressions used in the specification and claims are meant to include the chloride, oxide, hydroxide or carbonate of not only calcium, strontium and barium but also lead and other metals which preferentially react with the sulphate radical during the chloridizing steps to form an insoluble sulphate and prevent zinc and copper in particular, or other metals, from forming a sulphate by combination with such sulphate radical as may be present or formed during the process.

This chloridizing operation may be carried on by the method set forth in my co-pending applications, Serial No. 520,050 and Serial No. 687,827, or otherwise as desired within the scope of the appended claims. There are two main steps in my preferred method, one involving absorbing hydrochloric acid to convert the zinc oxide to a chloride and to form ferric oxide, and the other being the finishing step involving heating the partially treated material in the presence of oxygen to a temperature at which ferric chloride is not stable. The nascent chlorine evolved from such ferric chloride as may be present attacks the residual sulphides, as well as the difficultly chloridized ore metal compounds not previously chloridized.

The ore material has been kept in a finely divided condition during the entire roasting and leaching operations and its structure is as open and porous as is obtainable in accordance with the procedure above described. In the absorbers, the substantially dry, pulverulent material is passed, preferably in a counterflow relation, through hydrochloric acid gas. This gas reacts with zinc oxide to form zinc chloride. It also serves, after the zinc oxide has been satisfied, to form ferric chloride from the iron oxide present, but the amount of iron chloride to be formed may be controlled as desired. The chloridizing of other ore materials present need not be considered, but any other metal chloride formed during this step will be subsequently removed from the zinc chloride by suitable purification steps.

The absorption of hydrochloric acid gas is carried on in two stages, and if desired in two different pieces of apparatus. The first involves the treatment of the ore material in a heated condition, the temperature of which may be suitably regulated to control the moisture content of the ore. In the second absorber, the temperature is low and the hydrochloric acid gas is preferably present in a concentrated atmosphere. The residue of gas, water vapor and air coming from the second cold absorber passes to the first and hot absorber.

The temperature in the hot absorber may be controlled as desired, but if the zinc content is high, it is desirable to evaporate sufficient chemical water from the material so as to prevent the formation of the syrupy condition above described. If, however, only 20% of the zinc oxide content remains, then this condition need not be feared, and the temperature may be regulated as required by other factors in the ore treatment. I have found that a temperature of approximately 80° C. will serve efficiently in the formation of zinc chloride, and that the passage of air and gases through and out of the apparatus will serve to conduct away enough of the water vapor to insure that the ore material remains in a substantially dry condition. In the second absorber stage, which is employed when iron chloride is to be formed for use in a finishing operation, the ferrous and ferric chlorides will take up water of crystallization; hence, the temperature will be kept below the decomposition points of the iron chlorides.

While the finishing step may be omitted in the treatment of certain ores, yet there may be difficultly chloridized bodies in the roasted ore material, such as residual zinc sulphide, zinc silicate or zinc iron compounds, hence in such a case it is desirable to subject the ore to the action of chlorine gas, introduced for the purpose or formed in situ, and under conditions which result in the chloridizing of these refractory materials. My preferred method for accomplishing this purpose is to insure the formation of some ferric chloride in the absorber by reaction under oxidizing conditions of the hydrochloric acid gas with the iron oxide present in the roasted ore. The ore material containing this ferric chloride is passed into the finisher apparatus, which may be a rotary tube or other suitable apparatus, where the temperature is raised above the dissociation point of ferric chloride, and sufficient oxygen is admitted to cause a reaction between ferric chloride and oxygen, with the development of nascent chlorine. A suitable temperature for the finisher may be about 250° C. or higher, depending upon the type of ore being treated. The temperature, of course, should not be high enough to cause fusion of the ore material, or undesired physical or chemical reactions to take place. As the ferric chloride descends into the hot zone, it dissolves in its water of crystallization and in the chemical water formed by the reaction of HCl and ZnO and so gets into intimate contact with the ore particles. Hence, when the temperature is raised, the nascent chlorine thus developed is generated in close association with the ore particles where it may react quickly and directly with the refractory parts of the ore. As a consequence, the sulphide, silicate, ferrite or ferrate of zinc or other difficultly chloridized compounds remaining in the partially chloridized material are converted to the chlorides, while the ferric chloride is compelled to go to the insoluble ferric oxide condition.

It is to be understood that the chloridizing operations may be carried on in a single stage if it is not desired to employ a separate finisher step, in which case the absorber will preferably be kept at a temperature above the dissociation points of ferrous and ferric oxides and air will be mixed with the hydrochloric acid gas to insure that the iron remains in the chloridized material as ferric oxide. The claims are to be interpreted as covering this variation, as well as the preferred steps above described. It is also to be understood that it is within the scope of my invention to carry on the absorption of chloride ion by treating the roasted and leached ore in a bath of hydrochloric acid of desired strength.

As a result of this treatment, the zinc is now present as a chloride and it may be extracted from the residue by various suitable methods. For example, the zinc chloride may be dissolved from the residue by means of water to form a zinc chloride solution, while the lead sulphate and ferric oxide will remain with the residue. The calcium chloride which has been present or formed during the chloridizing stage will be dissolved with the zinc, and it may be suitably separated therefrom. One suitable method of accomplishing this is to treat the zinc and calcium chloride solutions with calcium carbonate, thereby forming zinc carbonate and calcium chloride. The precipitate of zinc carbonate is separated from the solution and may be treated with acid to reform zinc chloride or otherwise converted to other desirable compounds.

It will be understood that the calcium chloride or other alkaline earth material employed has gone through the chloridizing stages in a protective capacity, wherein it insures that zinc sulphate will not be formed by reaction of any zinc chloride or zinc oxide with available sulphate radical. Consequently, the zinc is compelled to go wholly to the chloride condition. Such soluble calcium sulphate as is present in the zinc chloride solution may be removed by suitable methods, depending upon what end products are desired. For example, the addition of barium chloride to the zinc chloride solution will serve to precipitate the sulphate radical as barium sulphate and leave calcium chloride in the solution. It, however, is evident that the zinc chloride solution containing this slight amount of calcium sulphate is commercially free of soluble sulphates.

Any lead chloride formed in the process and which goes with the zinc chloride may be suitably separated therefrom. The lead which remains with the residue as lead sulphate may be converted to lead chloride by leaching the residue with a hot sodium chloride solution which has not been acidulated with water. If acid were present, iron might be dissolved. In this way, I obtain lead chloride which is free from an iron compound. Consequently, the iron remains insoluble with the residue. The leaching with a hot salt solution, and subsequent cooling and crystallizing of the lead chloride may otherwise be carried on in accordance with standard practice, which involves a cyclic process of cooling the leaching solution to precipitate lead chloride, filtering the same, reheating the solution and returning it for further treatment of the ore material.

It will now be seen that I have, by this method, accomplished the desired end of recovering the zinc as both a sulphate and a chloride and that the process has been so carried on as to be efficient in its recovery of the desired metal. Both of the zinc compounds are free from soluble iron, and the chloride is free from its sulphate. It is also to be observed that the lead is separated free from iron, and the latter is retained in the residue as a pulverulent oxide which has various uses in the industry. Various other metals, such as copper, may be present in the ore but one skilled in this art will understand how to modify the process for treating an ore bearing such other metals.

Having thus described my invention, what I claim as new and desire to secure by Letters Patent is:

1. The method of recovering the zinc from a complex ore containing zinc and iron sulphides comprising the steps of roasting the ore to produce zinc and ferric oxides, leaching the roasted material with dilute sulphuric acid to remove the major portion of the zinc oxide as zinc sulphate and reducing the zinc oxide content of the roasted material to such an extent that, with reference to the capability of the residue to absorb the water of reaction during the chloridizing step, the amount of zinc chloride and water thus formed will be insufficient to materially hinder the penetration of the reagent gas, but leaving sufficient zinc oxide to prevent the iron from going into the solution as a sulphate, thereafter chloridizing the remaining zinc oxide content of the ore with hydrochloric acid and forming ferric chloride and heating the chloridized material with air to a temperature at which ferric chloride is not stable so as to form nascent chlorine for further chloridizing of the ore and leave the iron as an insoluble ferric oxide, whereby the zinc chloride may be dissolved and obtained substantially free of iron.

2. The method of recovering zinc from an ore containing a high content of zinc sulphide comprising the steps of roasting the ore, leaching the roasted material with dilute sulphuric acid to form zinc sulphate from a portion only of the zinc content and thereafter chloridizing the roasted ore in the presence of an alkaline earth metal compound added for the purpose which is capable of and proportioned for reacting with the available sulphate radical to form a sulphate and under conditions which form zinc chloride, said alkaline earth metal compound preventing the formation of zinc sulphate whereby a solution of zinc chloride free from zinc sulphate may be obtained from the ore.

3. The method of treating a complex ore containing zinc and iron sulphides, comprising the steps of roasting the material to form zinc and ferric oxides and zinc sulphate, removing all of the zinc sulphate from the roasted ore, but retaining zinc oxide therein, chloridizing the roasted material in the presence of alkaline earth metal compound added for the purpose, which is capable of and proportioned for reacting with any available sulphate radical to form alkaline earth metal sulphate, to convert the remainder of the zinc content of the ore to a chloride, heating the chlorodized material in an oxidizing atmosphere to cause the iron to be present as ferric oxide, and thereafter recovering zinc chloride from the residue which is free from zinc and iron sulphates.

4. The method of treating a complex ore containing iron and zinc sulphides, comprising the steps of roasting the material to form ferric and zinc oxides, leaching the roasted material with dilute sulphuric acid in quantity sufficient to remove all of the zinc sulphate and a portion of the zinc oxide, but leaving sufficient zinc oxide in the roasted material to prevent the formation of iron sulphate, adding a sufficient amount of a calcium compound capable of reacting with all of the available sulphate radical to form calcium sulphate therewith, chloridizing the mixture with hydrochloric acid to form zinc and iron chlorides, heating the material under oxidizing conditions to a temperature at which ferric chloride is not stable and causing the iron to remain as insoluble ferric oxide, and subsequently dissolving the zinc chloride from the residue.

5. The method of recovering iron-free zinc compounds from a complex ore containing iron and zinc sulphides, comprising the steps of roasting the ore under oxidizing conditions, leaching the roasted material with dilute sulphuric acid in quantity sufficient to remove all of the zinc sulphate, but leaving sufficient zinc oxide to prevent the iron from going into solution, thus forming an iron-free solution of zinc sulphate, adding an alkaline earth metal compound capable of and in sufficient quantity for reacting with all of the available sulphate radical to form an insoluble sulphate therewith, subjecting the mixture to the action of hydrochloric acid gas to form zinc chloride and subsequently heating the material in the presence of oxygen to a temperature at which ferric chloride is not stable to insure that the iron is present as ferric oxide, and dissolving the zinc chloride from the chloridized material, thereby producing an iron-free zinc chloride solution.

6. The method of treating a complex sulphide ore containing zinc, lead and iron sulphides comprising the steps of roasting the ore with an excess of oxygen to form a roast containing zinc oxide, lead sulphate and iron oxide, in which the latter is wholly in the ferric form, leaching the roast with a dilute sulphuric acid capable of removing the major portion of the zinc oxide therefrom, but leaving sufficient zinc oxide to insure that iron sulphate is not formed, thereby obtaining a solution of zinc sulphate free from iron and lead, thereafter treating the residue with hydrochloric acid gas to form zinc and iron chlorides, and heating the material in the presence of air to a temperature at which the iron chlorides are not stable, thereby leaving the iron in the form of ferric oxide, dissolving the zinc chloride from the residue as an iron-free solution, and thereafter leaching the residue with a hot solution of sodium chloride which is free from acid and thus forming a solution of lead chloride which is free from a soluble iron compound.

7. The method of recovering iron-free metal compounds from a complex ore containing sulphides of iron, zinc and lead, comprising the steps of roasting the ore under oxidizing conditions, leaching the roasted material with dilute sulphuric acid and obtaining zinc sulphate, but leaving sufficient zinc oxide to prevent the formation of iron sulphate, chloridizing the roasted material in the presence of a calcium compound added for the purpose, which is capable of and proportioned for reacting with the available sulphate radical to form calcium sulphate, by means of hydrochloric acid to form zinc chloride, and heating the material in the presence of oxygen and to a temperature at which any ferric chloride thus formed will not be stable and producing ferric oxide therefrom, dissolving the zinc chloride from the residue as an iron free solution, and thereafter leaching the residue with a hot sodium chloride solution which is free from acid and thereby forming a lead chloride solution which is free from an iron compound.

8. The method of treating an ore containing a high content of zinc sulphide comprising the steps of roasting the ore in finely divided form and under oxidizing conditions to convert a considerable proportion of the zinc sulphide to the oxide, then leaching the ore material with dilute sulphuric acid to form zinc sulphate and reducing the zinc oxide content of the ore material to such an extent that, with reference to the capability of the residue to absorb any water of reaction produced in a subsequent chloridizing process, the amount of zinc chloride and water thus later formed will be insufficient to produce a syrupy condition and so materially hinder the penetration of a reagent gas into the ore material, and thereafter chloridizing said leached material in a substantially dry condition with hydrochloric acid gas to form said zinc chloride and water of reaction and produce a substantially dry granular material which is readily penetrated by gaseous reagents.

9. The method of claim 8 in which the chloridizing operation is carried on in the presence of an alkaline earth metal compound added for the purpose which is capable of and proportioned for reacting with all of the available sulphate radical, whereby the formation of zinc sulphate from the residual zinc sulphide is prevented and the sulphate radical appears in the residue as an insoluble compound, and in which the zinc chloride is leached from the residue and obtained free from soluble zinc sulphate.

THOMAS A. MITCHELL.

CERTIFICATE OF CORRECTION.

Patent No. 1,943,340.   January 16, 1934.

THOMAS A. MITCHELL.

It is hereby certified that error appears in the printed specification of the above numbered patent requiring correction as follows: Page 4, line 13, for "chlodire" read chloride; line 85, claim 1, for "of" read from; and line 127, claim 4, after "capable of" insert the words and proportioned for; and that the said Letters Patent should be read with these corrections therein that the same may conform to the record of the case in the Patent Office.

Signed and sealed this 2nd day of October, A. D. 1934.

Leslie Frazer (Seal)   Acting Commissioner of Patents.

material in the presence of oxygen to a temperature at which ferric chloride is not stable to insure that the iron is present as ferric oxide, and dissolving the zinc chloride from the chloridized material, thereby producing an iron-free zinc chloride solution.

6. The method of treating a complex sulphide ore containing zinc, lead and iron sulphides comprising the steps of roasting the ore with an excess of oxygen to form a roast containing zinc oxide, lead sulphate and iron oxide, in which the latter is wholly in the ferric form, leaching the roast with a dilute sulphuric acid capable of removing the major portion of the zinc oxide therefrom, but leaving sufficient zinc oxide to insure that iron sulphate is not formed, thereby obtaining a solution of zinc sulphate free from iron and lead, thereafter treating the residue with hydrochloric acid gas to form zinc and iron chlorides, and heating the material in the presence of air to a temperature at which the iron chlorides are not stable, thereby leaving the iron in the form of ferric oxide, dissolving the zinc chloride from the residue as an iron-free solution, and thereafter leaching the residue with a hot solution of sodium chloride which is free from acid and thus forming a solution of lead chloride which is free from a soluble iron compound.

7. The method of recovering iron-free metal compounds from a complex ore containing sulphides of iron, zinc and lead, comprising the steps of roasting the ore under oxidizing conditions, leaching the roasted material with dilute sulphuric acid and obtaining zinc sulphate, but leaving sufficient zinc oxide to prevent the formation of iron sulphate, chloridizing the roasted material in the presence of a calcium compound added for the purpose, which is capable of and proportioned for reacting with the available sulphate radical to form calcium sulphate, by means of hydrochloric acid to form zinc chloride, and heating the material in the presence of oxygen and to a temperature at which any ferric chloride thus formed will not be stable and producing ferric oxide therefrom, dissolving the zinc chloride from the residue as an iron free solution, and thereafter leaching the residue with a hot sodium chloride solution which is free from acid and thereby forming a lead chloride solution which is free from an iron compound.

8. The method of treating an ore containing a high content of zinc sulphide comprising the steps of roasting the ore in finely divided form and under oxidizing conditions to convert a considerable proportion of the zinc sulphide to the oxide, then leaching the ore material with dilute sulphuric acid to form zinc sulphate and reducing the zinc oxide content of the ore material to such an extent that, with reference to the capability of the residue to absorb any water of reaction produced in a subsequent chloridizing process, the amount of zinc chloride and water thus later formed will be insufficient to produce a syrupy condition and so materially hinder the penetration of a reagent gas into the ore material, and thereafter chloridizing said leached material in a substantially dry condition with hydrochloric acid gas to form said zinc chloride and water of reaction and produce a substantially dry granular material which is readily penetrated by gaseous reagents.

9. The method of claim 8 in which the chloridizing operation is carried on in the presence of an alkaline earth metal compound added for the purpo e which is capable of and proportioned for reacting with all of the available sulphate radical, whereby the formation of zinc sulphate from the residual zinc sulphide is prevented and the sulphate radical appears in the residue as an insoluble compound, and in which the zinc chloride is leached from the residue and obtained free from soluble zinc sulphate.

THOMAS A. MITCHELL.

CERTIFICATE OF CORRECTION.

Patent No. 1,943,340.   January 16, 1934.

THOMAS A. MITCHELL.

It is hereby certified that error appears in the printed specification of the above numbered patent requiring correction as follows: Page 4, line 13, for "chlodire" read chloride; line 85, claim 1, for "of" read from; and line 127, claim 4, after "capable of" insert the words and proportioned for; and that the said Letters Patent should be read with these corrections therein that the same may conform to the record of the case in the Patent Office.

Signed and sealed this 2nd day of October, A. D. 1934.

Leslie Frazer (Seal)   Acting Commissioner of Patents.